(12) United States Patent
Tu et al.

(10) Patent No.: US 11,778,186 B2
(45) Date of Patent: *Oct. 3, 2023

(54) FLEXIBLE QUANTIZATION

(71) Applicant: Microsoft Technology Licensing, LLC, Redmond, WA (US)

(72) Inventors: Chengjie Tu, Sammamish, WA (US); Sridhar Srinivasan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,955

(22) Filed: Apr. 25, 2022

(65) Prior Publication Data

US 2022/0248021 A1    Aug. 4, 2022

Related U.S. Application Data

(63) Continuation of application No. 17/188,977, filed on Mar. 1, 2021, now Pat. No. 11,343,503, which is a continuation of application No. 16/825,239, filed on Mar. 20, 2020, now Pat. No. 10,958,907, which is a continuation of application No. 15/973,264, filed on May 7, 2018, now Pat. No. 10,602,146, which is a continuation of application No. 14/263,584, filed on
(Continued)

(51) Int. Cl.
*H04N 19/124*    (2014.01)
*H04N 19/176*    (2014.01)
*H04N 19/46*    (2014.01)
*H04N 19/61*    (2014.01)
*H04N 19/126*    (2014.01)
*H04N 19/136*    (2014.01)

(52) U.S. Cl.
CPC ......... *H04N 19/124* (2014.11); *H04N 19/126* (2014.11); *H04N 19/136* (2014.11); *H04N 19/176* (2014.11); *H04N 19/46* (2014.11); *H04N 19/61* (2014.11)

(58) Field of Classification Search
None
See application file for complete search history.

(56) References Cited

U.S. PATENT DOCUMENTS 7,801,383 B2    9/2010    Sullivan
7,974,340 B2    7/2011    Xia et al.
(Continued)

OTHER PUBLICATIONS

Office Action dated Dec. 8, 2022, from U.S. Appl. No. 17/727,994, 13 pp.
(Continued)

*Primary Examiner* — Xiaolan Xu
(74) *Attorney, Agent, or Firm* — Klarquist Sparkman, LLP

(57) ABSTRACT

A digital media encoder/decoder uses a flexible quantization technique that provides the ability to vary quantization along various dimensions of the encoded digital media data, including spatial, frequency sub bands and color channels. The codec utilizes a signaling scheme to signal various permutations of flexible quantization combinations efficiently for primary usage scenarios. When a choice of quantizer is available, the codec efficiently encodes the current quantizer by defining a subset of quantizers and indexes the current quantizer from the set.

13 Claims, 8 Drawing Sheets

Related U.S. Application Data

Apr. 28, 2014, now Pat. No. 9,967,561, which is a continuation of application No. 11/418,690, filed on May 5, 2006, now Pat. No. 8,711,925.

(56) References Cited

U.S. PATENT DOCUMENTS

| | | |
|---|---|---|
| 7,995,649 B2 | 8/2011 | Zuo et al. |
| 8,059,721 B2 | 11/2011 | Chang et al. |
| 8,130,828 B2 | 3/2012 | Hsu et al. |
| 8,184,694 B2 | 5/2012 | Srinivasan |
| 8,189,933 B2 | 5/2012 | Holcomb et al. |
| 8,238,424 B2 | 8/2012 | Chang et al. |
| 8,243,797 B2 | 8/2012 | Lin et al. |
| 8,249,145 B2 | 8/2012 | Chang et al. |
| 8,331,438 B2 | 12/2012 | Chang et al. |
| 8,422,546 B2 | 4/2013 | Lin et al. |
| 8,442,337 B2 | 5/2013 | Zuo et al. |
| 8,498,335 B2 | 7/2013 | Holcomb et al. |
| 8,503,536 B2 | 8/2013 | Zuo et al. |
| 8,576,908 B2 | 11/2013 | Lin et al. |
| 8,588,298 B2 | 11/2013 | Srinivasan |
| 8,711,925 B2 | 4/2014 | Tu et al. |
| 8,767,822 B2 | 7/2014 | Zuo et al. |
| 8,897,359 B2 | 11/2014 | Regunathan et al. |
| 9,185,418 B2 | 11/2015 | Regunathan et al. |
| 9,571,840 B2 | 2/2017 | Regunathan et al. |
| 9,967,561 B2 | 5/2018 | Tu et al. |
| 10,306,227 B2 | 5/2019 | Regunathan et al. |
| 10,602,146 B2 | 3/2020 | Tu et al. |
| 10,958,907 B2 | 3/2021 | Tu et al. |
| 11,122,268 B2 | 9/2021 | Regunathan et al. |
| 11,343,503 B2 | 5/2022 | Tu et al. |
| 2008/0089410 A1* | 4/2008 | Lu .................. H04N 19/126 375/E7.199 |
| 2021/0377535 A1 | 12/2021 | Regunathan et al. |
| 2022/0248022 A1 | 8/2022 | Tu et al. |
| 2022/0256153 A1 | 8/2022 | Tu et al. |
| 2022/0256154 A1 | 8/2022 | Tu et al. |

OTHER PUBLICATIONS

Notice of Allowance dated Oct. 3, 2022, from U.S. Appl. No. 17/404,832, 10 pp.

Summons to Attend Oral Proceedings dated Jul. 28, 2022, from European Patent Application No. 18187252.4, 9 pp.

U.S. Appl. No. 17/981,132, filed Nov. 4, 2022.

Decision to Refuse dated Apr. 4, 2023, from European Patent Application No. 18187252.4, 11 pp.

Office Action dated Apr. 19, 2023, from U.S. Appl. No. 17/728,070, 11 pp.

Office Action dated Apr. 19, 2023, from U.S. Appl. No. 17/728,020, 11 pp.

Office Action dated Jun. 8, 2023, from U.S. Appl. No. 17/981,132, 8 pp.

Notice of Allowance dated Jul. 27, 2023, from U.S. Appl. No. 17/727,994, 7 pp.

* cited by examiner

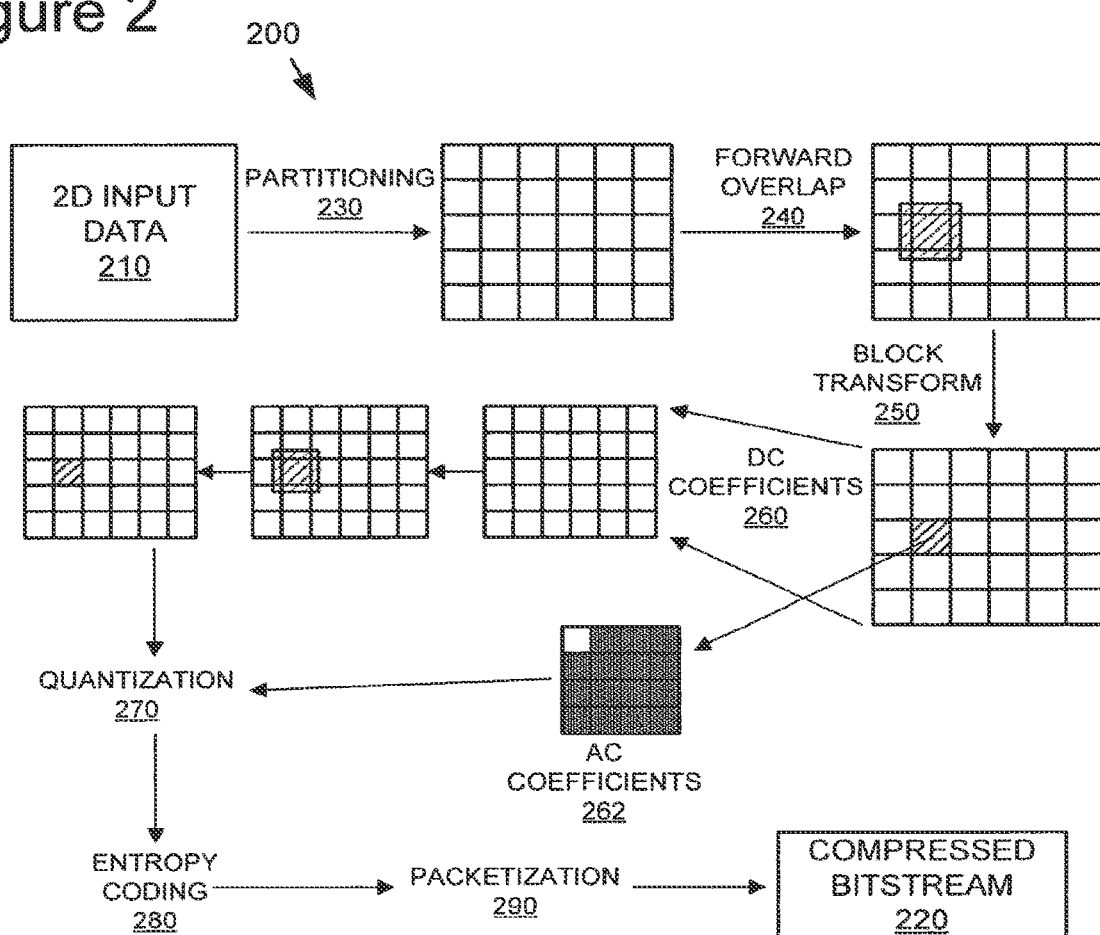

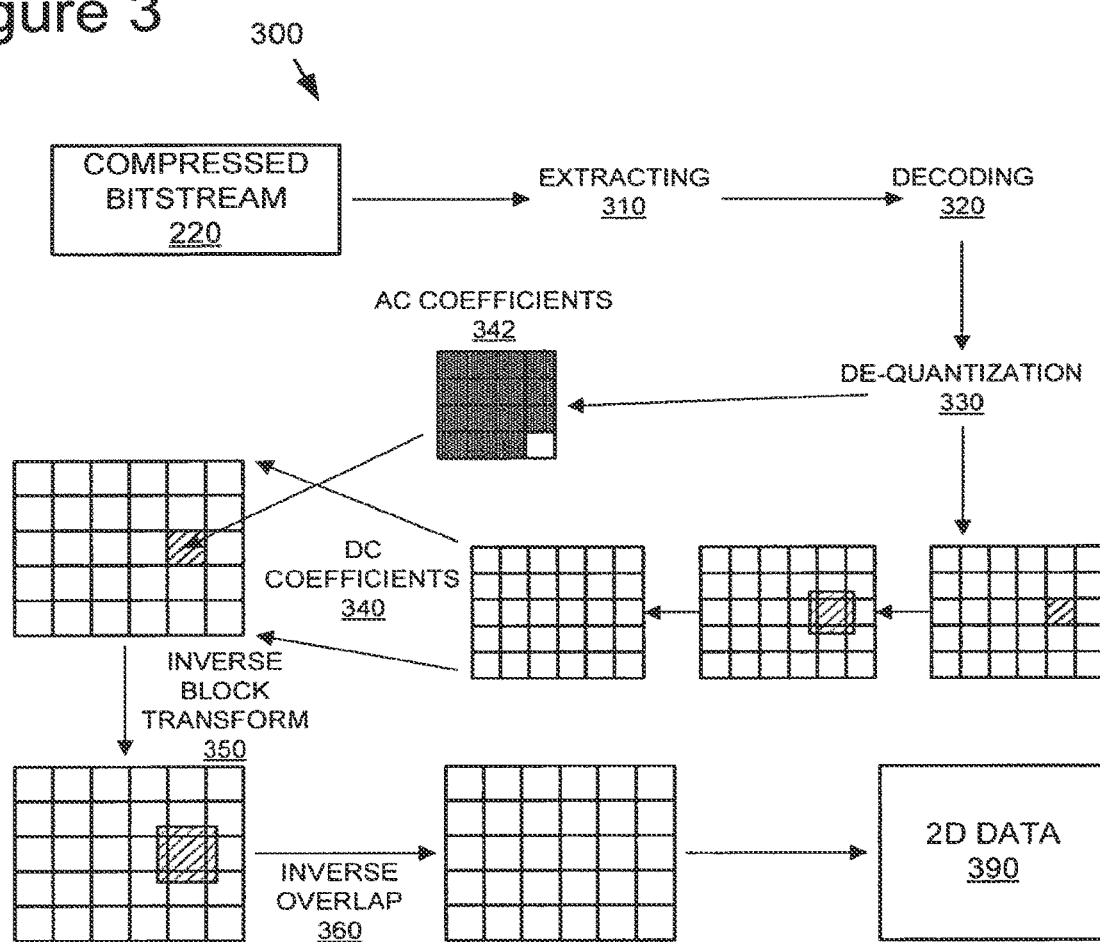

| DC_QUANTIZER () { | Num bits |
|---|---|
| if(CHANNELS == 1)<br>    DC_CH_MODE = CH_UNIFORM<br>Else<br>    DC_CH_MODE<br>if (DC_CH_MODE == CH_UNIFORM)<br>    DC_QUANT<br>Else if (DC_CH_MODE == CH_MIXED) {<br>    DC_QUANT_Y<br>    DC_QUANT_UV<br>}<br>Else if (DC_CH_MODE == CH_INDEPENDENT) {<br>    for (i = 0; i < CHANNELS; i++)<br>        DC_QUANT_CHANNEL_i<br>}<br>} | <br><br><br>2<br><br>8<br><br>8<br>8<br><br><br><br><br>8 |

| LP_QUANTIZER () { | Num bits |
|---|---|
| for (q = 0; q < LP_QUANTIZERS; q++) {<br>    if(CHANNELS == 1)<br>        LP_CHMODE[q] = CH_UNIFORM<br>    Else<br>        LP_CH_MODE[q]<br>    if (LP_CH_MODE[q] == CH_UNIFORM)<br>        LP_QUANT[q]<br>    else if (LP_CH_MODE[q] == CH_MIXED) {<br>        LP_QUANT_Y[q]<br>        LP_QUANT_UV[q]<br>    }<br>    else if (LP_CH_MODE[q] == CH_INDEPENDENT)<br>        for (i = 0; i < CHANNELS; i++)<br>            LP_QUANT_CHANNEL_i[q]<br>}<br>} | <br><br><br><br>2<br><br>8<br><br>8<br>8<br><br><br><br><br>8 |

| HP_QUANTIZER () { | Num bits |
|---|---|
| for (q = 0; q < HP_QUANTIZERS; q++) {<br>   if(CHANNELS == 1)<br>      HP_CH_MODE[q] = CH_UNIFORM<br>   Else<br>      HP_CH_MODE[q] | 2 |
|    if (HP_CH_MODE[q] == CH_UNIFORM)<br>      HP_QUANT[q] | 8 |
|    else if (LP_CH_MODE[q] == CH_MIXED) {<br>      HP_QUANT_Y[q]<br>      HP_QUANT_UV[q]<br>   } | 8<br>8 |
|    else if (HP_CH_MODE[q] == CH_INDEPENDENT)<br>      for (i = 0; i < CHANNELS; i++)<br>         HP_QUANT_CHANNEL_i[q]<br>}<br>} | 8 |

| FRAME () { | Num bits |
|---|---|
| ... | lots |
| DC_FRAME_UNIFORM | 1 |
| if (DC_FRAME_UNIFORM)<br>   DC_QUANTIZER | variable |
| if('lowpass not skipped'){<br>   USE_DC_QUANTIZER | 1 |
|    if(USE_DC_QUANTIZER == FALSE){<br>      LP_FRAME_UNIFORM | 1 |
|       If(LP_FRAME_UNIFORM){<br>         LP_QUANTIZERS = 1<br>         LP_QUANTIZER() | variable |
|       }<br>   }<br>} | |
| if('highpass not skipped'){<br>   USE_LP_QUANTIZER | 1 |
|    if(USE_LP_QUANTIZER == FALSE){<br>      HP_FRAME_UNIFORM | 1 |
|       If(HP_FRAME_UNIFORM){<br>         HP_QUANTIZERS = 1<br>         HP_QUANTIZER() | variable |
|       }<br>   }<br>}<br>} | |

FLEXIBLE QUANTIZATION

CROSS REFERENCE TO RELATED APPLICATIONS

This application is a continuation of U.S. Pat. App. No. 17/188,977, filed Mar. 1, 2021, which is a continuation of U.S. Pat. App. No. 16/825,239, filed Mar. 20, 2020, now U.S. Pat. No. 10,958,907, which is a continuation of U.S. Pat. App. No. 15/973,264, filed May 7, 2018, now U.S. Pat. No. 10,602,146, which is a continuation of U.S. Pat. App. No. 14/263,584, filed Apr. 28, 2014, now U.S. Pat. No. 9,967,561, which is a continuation of U.S. Pat. App. No. 11/418,690, filed May 5, 2006, now U.S. Pat. No. 8,711,925, the disclosure of which is hereby incorporated by reference.

BACKGROUND

1. Block Transform-Based Coding

Transform coding is a compression technique used in many audio, image and video compression systems. Uncompressed digital image and video is typically represented or captured as samples of picture elements or colors at locations in an image or video frame arranged in a two-dimensional (2D) grid. This is referred to as a spatial-domain representation of the image or video. For example, a typical format for images consists of a stream of 24-bit color picture element samples arranged as a grid. Each sample is a number representing color components at a pixel location in the grid within a color space, such as RGB, or YIQ, among others. Various image and video systems may use various different color, spatial and time resolutions of sampling. Similarly, digital audio is typically represented as time-sampled audio signal stream. For example, a typical audio format consists of a stream of 16-bit amplitude samples of an audio signal taken at regular time intervals.

Uncompressed digital audio, image and video signals can consume considerable storage and transmission capacity. Transform coding reduces the size of digital audio, images and video by transforming the spatial-domain representation of the signal into a frequency-domain (or other like transform domain) representation, and then reducing resolution of certain generally less perceptible frequency components of the transform-domain representation. This generally produces much less perceptible degradation of the digital signal compared to reducing color or spatial resolution of images or video in the spatial domain, or of audio in the time domain.

More specifically, a typical block transform-based codec 100 shown in FIG. 1 divides the uncompressed digital image's pixels into fixed-size two dimensional blocks ($X_1, \ldots X_n$), each block possibly overlapping with other blocks. A linear transform 120-121 that does spatial-frequency analysis is applied to each block, which converts the spaced samples within the block to a set of frequency (or transform) coefficients generally representing the strength of the digital signal in corresponding frequency bands over the block interval. For compression, the transform coefficients may be selectively quantized 130 (i.e., reduced in resolution, such as by dropping least significant bits of the coefficient values or otherwise mapping values in a higher resolution number set to a lower resolution), and also entropy or variable-length coded 130 into a compressed data stream. At decoding, the transform coefficients will inversely transform 170-171 to nearly reconstruct the original color/spatial sampled image/video signal (reconstructed blocks $\hat{X}_1, \ldots \hat{X}_n$).

The block transform 120-121 can be defined as a mathematical operation on a vector x of size N. Most often, the operation is a linear multiplication, producing the transform domain output y=M×M being the transform matrix. When the input data is arbitrarily long, it is segmented into N sized vectors and a block transform is applied to each segment. For the purpose of data compression, reversible block transforms are chosen. In other words, the matrix M is invertible. In multiple dimensions (e.g., for image and video), block transforms are typically implemented as separable operations, The matrix multiplication is applied separably along each dimension of the data (i.e., both rows and columns).

For compression, the transform coefficients (components of vector y) may be selectively quantized (i.e., reduced in resolution, such as by dropping least significant bits of the coefficient values or otherwise mapping values in a higher resolution number set to a lower resolution), and also entropy or variable-length coded into a compressed data stream.

At decoding in the decoder 150, the inverse of these operations (dequantization/entropy decoding 160 and inverse block transform 170-171) are applied on the decoder 150 side, as show in FIG. 1. While reconstructing the data, the inverse matrix $M^{-1}$ (inverse transform 170-171) is applied as a multiplier to the transform domain data. When applied to the transform domain data, the inverse transform nearly reconstructs the original time-domain or spatial-domain digital media.

In many block transform-based coding applications, the transform is desirably reversible to support both lossy and lossless compression depending on the quantization factor. With no quantization (generally represented as a quantization factor of 1) for example, a codec utilizing a reversible transform can exactly reproduce the input data at decoding. However, the requirement of reversibility in these applications constrains the choice of transforms upon which the codec can be designed.

Many image and video compression systems, such as MPEG and Windows Media, among others, utilize transforms based on the Discrete Cosine Transform (DCT). The DCT is known to have favorable energy compaction properties that result in near-optimal data compression. In these compression systems, the inverse DCT (IDCT) is employed in the reconstruction loops in both the encoder and the decoder of the compression system for reconstructing individual image blocks.

2. Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, with or without dead zone, and adaptive or non-adaptive quantization.

The quantization operation is essentially a biased division by a quantization parameter QP which is performed at the encoder. The inverse quantization or multiplication operation is a multiplication by QP performed at the decoder. These processes together introduce a loss in the original transform coefficient data, which shows up as compression errors or artifacts in the decoded image. In a simplistic codec, a certain fixed value of QP can be applied to all transform coefficients in a frame. While this may be an acceptable solution in some cases, it has several deficiencies:

The human visual system is not equally sensitive to all frequencies, or to all spatial locations within a frame, or to all luminance and chrominance channels. Using different QP values for different coefficients may provide a visually superior encoding even with the same or smaller number of compressed bits. Likewise, other error metrics can be suitably optimized as well.

Rate control or the ability of an encoder to produce a compressed file of a desired size is not easy to perform with a single QP across the entire frame.

It is therefore desirable to allow the encoder to vary QP across the image in an arbitrary manner. However, this means that the actual value of QP used for each data partition should be signaled in the bitstream. This leads to an enormous overhead just to carry the QP signaling information, making it unsuitable in practice. What is desired is a flexible yet bit-economic means of signaling QP, particularly for commonly encountered scenarios.

In summary, quantization is the primary mechanism for most image and video codecs to control compressed image quality and compression ratio. Quantization methods supported by most popular codecs provide few features or little flexibility, or incur significant overhead of additional bits. Often, an image or a video frame is usually quantized uniformly, or with limited ability to vary quantization over spatial locations. This lack of flexibility hurts compression quality, and prevents accurate rate control on the fly. On the other hand, some codecs provide nearly unrestricted freedom in supporting quantization methods. Encoding to signal use of different quantizers takes additional bits in the encoded media, and could itself adversely affect compression efficiency. Further, the process of building a conformant decoder requires a large number of test passes generated by all possible combinations of the quantizer methods, which can be onerous.

SUMMARY

The following Detailed Description presents variations of a flexible quantization technique that provides the ability to vary quantization along various dimensions of the encoded digital media data. For example, one representative implementation of the flexible quantization technique can vary quantization over three dimensions over (i) spatial locations, (ii) frequency sub bands, and (iii) color channels. The Detailed Description further presents ways to efficiently signal the flexible quantization in the encoded digital media data. The benefit of this quantization approach is that the overhead incurred by quantization related side information is minimized for the primary usage scenarios, while allowing maximum flexibility if desired by the encoder.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

BRIEF DESCRIPTION OF THE DRAWINGS

FIG. 2 is a flow diagram of a representative encoder incorporating the block pattern coding.

FIG. 3 is a flow diagram of a representative decoder incorporating the block pattern coding.

FIG. 4 is a table containing a pseudo-code definition for signaling of a DC quantizer according to a flexible quantization technique.

FIG. 5 is a table containing a pseudo-code definition for signaling of a low-pass quantizer according to the flexible quantization technique.

FIG. 6 is a table containing a pseudo-code definition for signaling of a high-pass quantizer according to the flexible quantization technique.

FIG. 7 is a table containing a pseudo-code definition for signaling of quantizers at a frame layer according to the flexible quantization technique.

DETAILED DESCRIPTION

Figure 1:
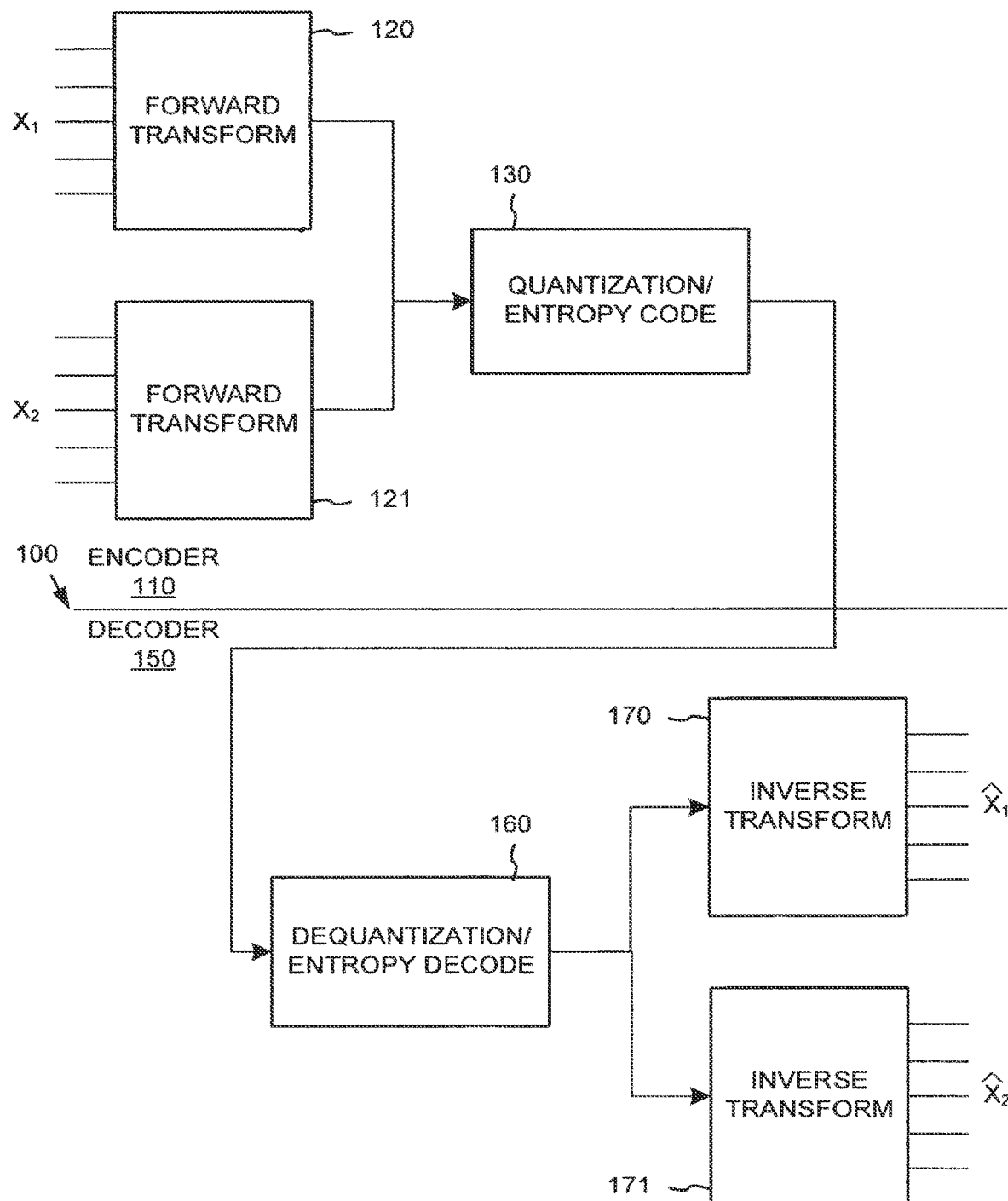
FIG. 1 is a block diagram of a conventional block transform-based codec in the prior art.
Figure 8:
FIG. 8 is a table containing a pseudo-code definition for signaling of quantizers at a tile layer in spatial mode according to the flexible quantization technique.
Figure 9:
FIG. 9 is a table containing a pseudo-code definition for signaling of quantizers of a DC sub-band at the tile layer in frequency mode according to the flexible quantization technique.
Figure 10:
FIG. 10 is a table containing a pseudo-code definition for signaling of quantizers of a low-pass sub-band at the tile layer in frequency mode according to the flexible quantization technique.
Figure 11:
FIG. 11 is a table containing a pseudo-code definition for signaling of quantizers of a high-pass sub-band at the tile layer in frequency mode according to the flexible quantization technique.
Figure 12:
FIG. 12 is a table containing a pseudo-code definition for signaling of quantizers at a macroblock layer in spatial mode according to the flexible quantization technique.
Figure 13:
FIG. 13 is a table containing a pseudo-code definition for signaling of low-pass quantizers at the macroblock layer in frequency mode according to the flexible quantization technique.

The following description relates to coding and decoding techniques that provide efficient flexible quantization that can vary the quantization applied along spatial, frequency and color dimensions (referred to herein as "Flexible Quantization"). The following description describes an example implementation of the technique in the context of a digital media compression system or codec. The digital media system codes digital media data in a compressed form for transmission or storage, and decodes the data for playback or other processing. For purposes of illustration, this exemplary compression system incorporating this flexible quantization is an image or video compression system. Alternatively, the technique also can be incorporated into compression systems or codecs for other 2D data. The flexible quantization technique does not require that the digital media compression system encodes the compressed digital media data in a particular coding format.

1. Encoder/Decoder

FIGS. 2 and 3 are a generalized diagram of the processes employed in a representative 2-dimensional (2D) data encoder 200 and decoder 300. The diagrams present a generalized or simplified illustration of a compression system incorporating the 2D data encoder and decoder that implement the block pattern coding. In alternative compression systems using the block pattern coding, additional or fewer processes than those illustrated in this representative encoder and decoder can be used for the 2D data compression. For example, some encoders/decoders may also include color conversion, color formats, scalable coding, lossless coding, macroblock modes, etc. The compression system (encoder and decoder) can provide lossless and/or lossy compression of the 2D data, depending on the quantization which may be based on a quantization parameter varying from lossless to lossy.

The 2D data encoder 200 produces a compressed bitstream 220 that is a more compact representation (for typical input) of 213 data 210 presented as input to the encoder. For example, the 2D data input can be an image, a frame of a video sequence, or other data having two dimensions. The 2D data encoder divides a frame of the input data into blocks (illustrated generally in FIG. 2 as partitioning 230), which in the illustrated implementation are non-overlapping 4×4 pixel blocks that form a regular pattern across the plane of the frame. These blocks are grouped in clusters, called macroblocks, which are 16×16 pixels in size in this representative encoder, In turn, the macroblocks are grouped into regular structures called tiles. The tiles also form a regular pattern over the image, such that tiles in a horizontal row are of uniform height and aligned, and tiles in a vertical column are of uniform width and aligned. In the representative encoder, the tiles can be any arbitrary size that is a multiple of 16 in the horizontal and/or vertical direction. Alternative encoder implementations can divide the image into block, macroblock, tiles, or other units of other size and structure.

A "forward overlap" operator 240 is applied to each edge between blocks, after which each 4×4 block is transfomed used using a block transform 250. This block transform 250 can be the reversible, scale-free 2D transform described by Srinivasan, U.S. patent application Ser. No. 11/015,707, entitled, "Reversible Transform For Lossy And Lossless 2-D Data Compression," filed Dec. 17, 2004. The overlap operator 240 can be the reversible overlap operator described by Tu et al., U.S. patent application Ser. No. 11/015,148, entitled, "Reversible Overlap Operator for Efficient Lossless Data Compression," filed Dec. 17, 2004; and by Tu et al., U.S. patent application Ser. No. 11/035,991, entitled, "Reversible 2-Dimensional Pre-/Post-Filtering For Lapped Biorthogonal Transform," filed Jan. 14, 2005. Alternatively, the discrete cosine transform or other block transforms and overlap operators can be used. Subsequent to the transform, the DC coefficient 260 of each 4×4 transform block is subject to a similar processing chain (tiling, forward overlap, followed by 4×4 block transform). The resulting DC transform coefficients and the AC transform coefficients are quantized 270, entropy coded 280 and packetized 290.

The decoder performs the reverse process. On the decoder side, the transform coefficient bits are extracted 310 from their respective packets, from which the coefficients are themselves decoded 320 and dequantized 330. The DC coefficients 340 are regenerated by applying an inverse transform, and the plane of DC coefficients is "inverse overlapped" using a suitable smoothing operator applied across the DC block edges. Subsequently, the entire data is regenerated by applying the 4×4 inverse transform 350 to the DC coefficients, and the AC coefficients 342 decoded from the bitstream. Finally, the block edges in the resulting image planes are inverse overlap filtered 360. This produces a reconstructed 2D data output.

In an exemplary implementation, the encoder 200 (FIG. 2) compresses an input image into the compressed bitstream 220 (e.g., a file), and the decoder 300 (FIG. 3) reconstructs the original input or an approximation thereof, based on whether lossless or lossy coding is employed. The process of encoding involves the application of a forward lapped transform (LT) discussed below, which is implemented with reversible 2-dimensional pre-/post-filtering also described more fully below. The decoding process involves the application of the inverse lapped transform (ILT) using the reversible 2-dimensional pre-/post-filtering.

The illustrated LT and the ILT are inverses of each other, in an exact sense, and therefore can be collectively referred to as a reversible lapped transform. As a reversible transform, the LT/ILT pair can be used for lossless image compression.

The input data 210 compressed by the illustrated encoder 200/decoder 300 can be images of various color formats (e.g., RGB/YUV4:4:4, YUV4:2:2 or YUV4:2:0 color image formats). Typically, the input image always has a luminance (Y) component. If it is a RGB/YUV4:4:4, YUV4:2:2 or YUV4:2:0 image, the image also has chrominance components, such as a U component and a V component. The separate color planes or components of the image can have different spatial resolutions. In case of an input image in the YUV 4:2:0 color format for example, the U and V components have half of the width and height of the Y component.

As discussed above, the encoder 200 tiles the input image or picture into macroblocks. In an exemplary implementation, the encoder 200 tiles the input image into 16×16 pixel areas (called "macroblocks") in the Y channel (which may be 16×16, 16×8 or 8×8 areas in the U and V channels depending on the color format). Each macroblock color plane is tiled into 4×4 pixel regions or blocks. Therefore, a macroblock is composed for the various color formats in the following manner for this exemplary encoder implementation:

1. For a grayscale image, each macroblock contains 16 4×4 luminance (Y) blocks
2. For a YUV4:2:0 format color image, each macroblock contains 16 4×4 Y blocks, and 4 each 4×4 chrominance (U and V) blocks.
3. For a YUV4:2:2 format color image, each macroblock contains 16 4×4 Y blocks, and 8 each 4×4 chrominance (U and V) blocks.
4. For a RGB or YUV4:4:4 color image, each macroblock contains 16 blocks each of Y, U and V channels.

Accordingly, after transform, a macroblock in this representative encoder 200/decoder 300 has three frequency sub bands: a DC sub band (DC macroblock), a low pass sub band (low pass macroblock), and a high pass sub band (high pass macroblock). In the representative system, the low pass and/or high pass sub bands are optional in the bitstream these sub bands may be entirely dropped.

Further, the compressed data can be packed into the bitstream in one of two orderings: spatial order and frequency order. For the spatial order, different sub bands of the same macroblock within a tile are ordered together, and the resulting bitstream of each tile is written into one packet. For the frequency order, the same sub band from different macroblocks within a tile are grouped together, and thus the bitstream of a tile is written into three packets: a DC tile packet, a low pass tile packet, and a high pass tile packet. In addition, there may be other data layers.

Thus, for the representative system, an image is organized in the following "dimensions":
Spatial dimension: Frame→Tile→Macroblock;
Frequency dimension: DC|Low pass|High pass; and
Channel dimension: Luminance|Chrominance_0|Chrominance_1 . . . (e.g. as Y|U|V).
The arrows above denote a hierarchy, whereas the vertical bars denote a partitioning.

Although the representative system organizes the compressed digital media data in spatial, frequency and channel dimensions, the flexible quantization approach described here can be applied in alternative encoder/decoder systems that organize their data along fewer, additional or other dimensions. For example, the flexible quantization approach can be applied to coding using a larger number of frequency bands, other format of color channels (e.g., YIQ, RGB, etc.), additional image channels (e.g., for stereo vision or other multiple camera arrays).

2. Flexible Quantization Overview

In the representative encoder/decoder, the quantization operation is essentially a biased division by a quantization parameter QP which is performed at the encoder. The inverse quantization or multiplication operation is a multiplication by QP performed at the decoder. However, alternative implementations of the flexible quantization described herein can utilize other forms of quantization, including uniform and non-uniform, scalar or vector, with or without dead zone, etc. The quantization/inverse quantization processes together introduce a loss in the original transform coefficient data, which shows up as compression errors or artifacts in the decoded image. In a simplistic codec, a certain fixed value of QP can be applied to all transform coefficients in a frame. While this may be an acceptable solution in some cases, it has several deficiencies:

The human visual system is not equally sensitive to all frequencies, or to all spatial locations within a frame, or to all luminance and chrominance channels. Using different QP values for different coefficients may provide a visually superior encoding even with the same or smaller number of compressed bits, Likewise, other error metrics can be suitably optimized as well.

Rate control or the ability of an encoder to produce a compressed file of a desired size is not easy to perform with a single QP across the entire frame.

Ideally therefore, it should be possible to allow the encoder to vary QP across the image in an arbitrary manner. However, this means that the actual value of QP used for each data partition (macroblock/tile/channel/sub band, etc.) should be signaled in the bitstream. This leads to an enormous overhead just to carry the QP signaling information, making it unsuitable in practice. What is desired is a flexible yet bit-economic means of signaling QP, particularly for commonly encountered scenarios.

The flexible quantization technique described herein provides the ability to vary quantization along various partitions or dimensions of the encoded digital media data. For example, one implementation of the flexible quantization technique in the representative encoder 200/decoder 300 system can vary quantization over three dimensions—over (i) spatial locations, (ii) frequency sub bands, and (iii) color channels, However, quantization can be varied over fewer, additional or other dimensions or partitions of the data in other alternative implementations of the flexible quantization technique. This technique also includes ways to efficiently signal the flexible quantization in the encoded media data. The benefit of this quantization approach is that the overhead incurred by quantization related side information is minimized for the primary usage scenarios, while allowing maximum flexibility if desired by the encoder.

The flexible quantization technique provides fine spatial granularity control of the quantization. In one particular implementation, the flexible quantization allows control over quantization applied to the frame, tile, or down to the macroblock. If the frame is not quantized uniformly, then each tile can be quantized uniformly; if a tile is not quantized uniformly, then each macroblock will be quantized differently.

The flexible quantization further allows quantization control along the frequency sub band dimension. In one particular implementation, the flexible quantization includes a sub band mode to specify a quantization relationship among frequency sub bands. The sub bands can be quantized uniformly, or partially uniformly (low pass sub band using DC sub band quantizer, and/or high pass sub hand using low pass quantizer), or independently.

The flexible quantization also allows control over quantization applied along the channel dimension of the data. In one particular implementation, the flexible quantization includes a channel mode to specify a quantization relationship among color channels. The channels can be quantized uniformly, or partially uniformly (chrominance channels uniformly but luminance independently), or independently.

The flexible quantization described herein also provides techniques to efficiently signal in side information of the compressed digital media data, combinations of the above quantization control over spatial, frequency sub band and channel that are of significance to the primary usage scenarios. Further, the flexible quantization technique provides a way to efficiently define choice of quantizer by indexing from a defined subset of possible quantizers in the digital media data.

3. Flexible Quantization in the Spatial Dimension:

In the spatial dimension, three choices are provided by the flexible quantization technique in the representative encoder/decoder:

The entire frame can be coded using the same quantization rule.

Else, an entire tile can be coded using the same quantization rule and different tiles within the frame can use different quantization rules.

Else, each macroblock within a tile can be coded using the same quantization rule and different macroblocks within the tile can use different quantization rules.

One means of signaling these possibilities is as follows: A binary signal is sent in the bitstream at the frame level indicating whether the first possibility is true. If not, a fixed length symbol is sent in the bitstream within each tile indicating the number of quantization rules used for this tile. If the tile uses more than quantization rule, then a variable length symbol is sent within each macroblock within the corresponding tile that indicates the quantization rule used by the macroblock. The decoder interprets the bitstream in a manner consistent with the encoder.

The representative encoder 200/decoder 300 uses a variant of the above signaling. A binary signal, represented by a generic syntax element, herein labeled as "XXX_FRAME_UNIFORM," is only sent at the frame level (where XXX is a placeholder specifying the particular frequency sub band or channel dimension of quantizer control). At the tile level, the number of distinct quantizer rules is sent in a tile-level syntax element (XXX_QUANTIZERS) only when the frame level syntax element (XXX_FRAME_UNIFORM) is false. If this number is equal to 1, it means that there is only one rule and therefore all macroblocks within the tile are uniformly coded with the same quantization rule (indicating choice 2), and if not it indicates choice of the third possibility.

4. Flexible Quantization Across Frequency Bands:

For flexible quantization across frequency bands, the bitstream syntax of the representative encoder 200/decoder 300 defines two switches:

The low pass macroblock uses the same quantization rule as the DC macroblock at the same spatial location. This corresponds to the syntax element USE_DC_QUANTIZER. The high pass macroblock uses the same quantization rule as the low pass macroblock at the same spatial location. This corresponds to the syntax element USE_LP_QUANTWER.

These switches are enabled at the frame layer when the entire frame uses the same quantization rule, or at the tile layer otherwise. These switches are not enabled at the macroblock layer. All macroblocks within a tile therefore obey the same rules across frequency bands. A binary symbol is sent for each of the switches at the appropriate (frame or tile) layer.

5. Flexible Quantization Across Image Channels:

For flexible quantization across channels, the bitstream syntax of the representative encoder 200/decoder 300 permits three choices:

All channels—luminance and chrominance have the same quantization rule. This is indicated by the generic syntax element XXX_CH_MODE=CH_UNIFORM.

Luminance follows one quantization rule and all chrominance channels follow a different quantization rule, indicated by XXX_CH_MODE=CH_MIXED.

All channels are free to choose different quantization rules, indicated by XXX_CH_MODE=CH_INDEPENDENT.

6. Combinatorial Flexible Quantization:

The representative encoder 200/decoder 300 uses a bitstream syntax defined in the code tables shown in FIGS. 4-14 that can efficiently encode the particular choice out of the flexible quantization options across the dimensions discussed above. With several quantization options available across each of the spatial, frequency sub band and channel dimensions, the number of permutations of the available quantization options is large. Adding to the complexity of flexible quantization across the three dimensions is the fact that the bitstream of the representative encoder 200/decoder 300 can be laid out in spatial or frequency ordering. However, this does not change the available quantization options, and only affects the serialization of the signals. The. syntax defined in FIGS. 4-14 provides an efficient coding of the combinatorial flexible quantization rules.

Some salient features of the combinatorial quantization rules as defined in the syntax of the representative encoder/decoder are as follows.

DC quantization is not allowed to vary on a macroblock basis. This allows the differential coding of quantized DC values without having to do an inverse scaling operation. Coding the DC band of an image tile with a relatively small quantizer even when the AC (low pass and high pass) bands are coded with varying quantization does not appreciably affect the bit rate.

At one end of the scale, all transform coefficients within a frame use the same quantization parameter. At the other end of the scale, low pass and high pass quantization rules for all channels are allowed to vary independently for each macroblock of the tile/frame. The only restriction is that the number of distinct low pass and high pass quantizer rules (covering all channels) is each restricted to 16. Each such rule may specify independent values of quantization parameter for each channel.

Between these extremes, several combinations are permitted as specified by the syntax tables shown in FIGS. 4-14.

7. Indexing of Quantizer Parameters:

The specific quantization parameter (QP) in the representative encoder/decoder is based on a harmonic scale. An 8 bit-value of a quantizer parameter index (QPI) corresponds to a value of QP which can be relatively large. A second level of indexing is performed so that QPIs varying across macroblocks can be coded in an efficient manner.

More particularly, the encoder 200 can define a set in the bitstream containing between 1 and 16 QPI "vectors." Each QPI vector is composed of one or more QPI values, based on which XXX_CHANNEL_MODE is chosen. Such sets are defined for DC, low pass and high pass sub bands, based on the frequency band switch. Further, the DC set has only one QPI vector since only one DC quantizer is permissible in a tile-channel. The coding of these sets is defined in the tables shown in FIGS. 4-6.

As shown in the tables of FIGS. 7-11, signaling of the QPI vector sets of DC, low pass and high pass frequency sub bands occurs as follows. Based on the other coding modes, the cardinality of each set (i.e., the number of QPI vectors in the set) is indicated for low pass and high pass sub bands at the start of the corresponding tile or frame. The cardinality of the DC set is 1. In the pseudo-code tables, the syntax element denoting cardinality is labeled as "XXX_QUANTIZERS." (in practice, XXX_QUANTIZERS−1 is sent in the bitstream.) The syntax elements labeled "XXX_QUANTIZER" in the tables denotes the coding of QPI sets, which is defined in the tables shown in FIGS. 4-6.

At the macroblock level, it is sufficient to send only the index QI of the desired QPI vector from within the QPI set. The tables in FIGS. 12-14 define the syntax of sending QI on a macroblock basis. The syntax element corresponding to QI is labeled, "XXX_QUANTIZER_INDEX." A variable length code is used to signal QI. First, a one bit symbol is sent indicating whether QI is zero or not. If not, then a fixed length code of length being given by ceil($\log_2$(XXX_QUANTIZERS−1)) is sent indicating the specific QI different from zero. This allows for an efficient encoding of a "default" quantization rule (QI=0) with as low as one bit per macroblock. When XXX_QUANTIZERS is 1, XXX_QUANTIZER_INDEX is uniquely zero and therefore QI need not be signaled.

8. Extensions

The above description of the flexible quantization is specific to its implementation in a representative encoder and decoder, and syntax. However, the principles of this technique are extensible to other digital media compression systems and formats as well. For instance, the representative encoder/decoder has only three frequency sub bands (DC, low pass and high pass). But, more generally, alternative implementations of the flexible quantization can be extended in a straightforward manner to a multitude of frequency sub bands. Likewise, alternative flexible quantization implementations can vary the quantizer at finer spatial granularity, such as by sending quantization index (QI) information at the sub-macroblock (such as block) level. Many extensions to the underlying principles of the flexible quantization technique are possible within the same framework.

9. Computing Environment

The above-described processing techniques for flexible quantization can be realized on any of a variety of digital media encoding and/or decoding systems, including among other examples, computers (of various form factors, including server, desktop, laptop, handheld, etc.); digital media recorders and players; image and video capture devices (such as cameras, scanners, etc.); communications equipment (such as telephones, mobile phones, conferencing equipment, etc.); display, printing or other presentation devices; and etc. The flexible quantization techniques can be implemented in hardware circuitry, in firmware controlling digital media processing hardware, as well as in communication software executing within a computer or other computing environment, such as shown in FIG. 15.

Figures 14, 15:
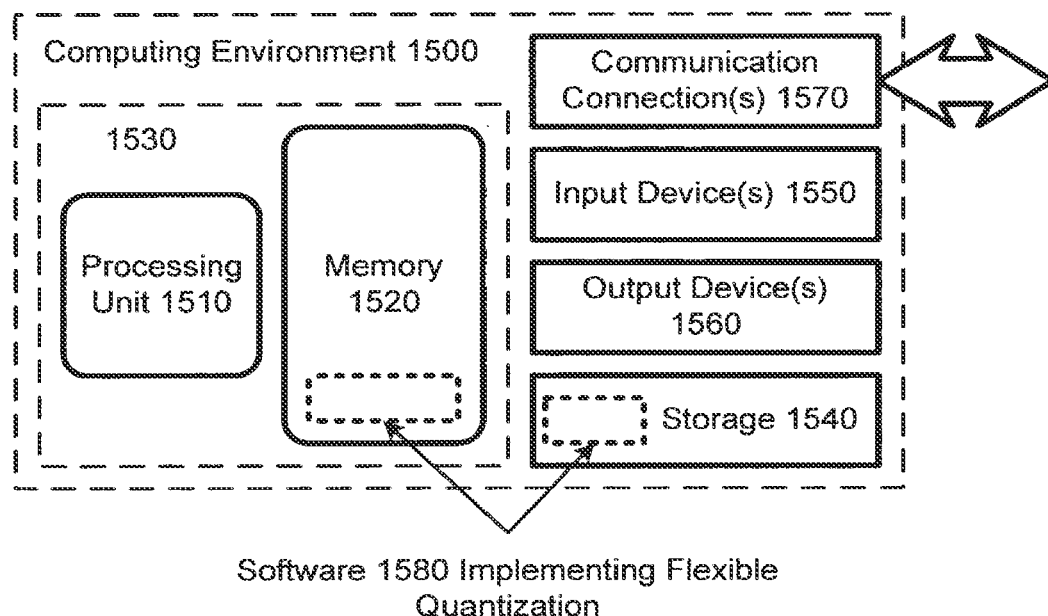
FIG. 14 is a table containing a pseudo-code definition for signaling of high-pass quantizers at the macroblock layer in frequency mode according to the flexible quantization technique.
FIG. 15 is a block diagram of a suitable computing environment for implementing a media encoder/decoder with flexible quantization.

FIG. 15 illustrates a generalized example of a suitable computing environment (1500) in which described embodiments may be implemented. The computing environment (1500) is not intended to suggest any limitation as to scope of use or functionality of the invention, as the present invention may be implemented in diverse general-purpose or special-purpose computing environments.

With reference to FIG. 15, the computing environment (1500) includes at least one processing unit (1510) and memory (1520). In FIG. 15, this most basic configuration (1530) is included within a dashed line. The processing unit (1510) executes computer-executable instructions and may be a real or a virtual processor. In a multi-processing system, multiple processing units execute computer-executable instructions to increase processing power. The memory (1520) may be volatile memory (e.g., registers, cache, RAM), non-volatile memory (e.g., ROM, EEPROM, flash memory, etc.), or some combination of the two. The memory (1520) stores software (1580) implementing the described digital media encoding/decoding with flexible quantization techniques.

A computing environment may have additional features. For example, the computing environment (1500) includes storage (1540), one or more input devices (1550), one or more output devices (1560), and one or more communication connections (1570). An interconnection mechanism (not shown) such as a bus, controller, or network interconnects the components of the computing environment (1500). Typically, operating system software (not shown) provides an operating environment for other software executing in the computing environment (1500), and coordinates activities of the components of the computing environment (1500).

The storage (1540) may be removable or non-removable, and includes magnetic disks, magnetic tapes or cassettes, CD-ROMs, CD-RWs, DVDs, or any other medium which can be used to store information and which can be accessed within the computing environment (1500). The storage (1540) stores instructions for the software (1580) implementing the described digital media encoding/decoding with flexible quantization techniques.

The input device(s) (1550) may be a touch input device such as a keyboard, mouse, pen, or trackball, a voice input device, a scanning device, or another device that provides input to the computing environment (1500). For audio, the input device(s) (1550) may be a sound card or similar device that accepts audio input in analog or digital form from a microphone or microphone array, or a CD-ROM reader that provides audio samples to the computing environment. The output device(s) (1560) may be a display, printer, speaker, CD-writer, or another device that provides output from the computing environment (1500).

The communication connection(s) (1570) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier, The described digital media encoding/decoding with flexible quantization techniques herein can be described in the general context of computer-readable media. Computer-readable media are any available media that can be accessed within a computing environment. By way of example, and not limitation, with the computing environment (1500), computer-readable media include memory (1520), storage (1540), communication media, and combinations of any of the above.

The described digital media encoding/decoding with flexible quantization techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A computer system comprising one or more processing units and memory, wherein the computer system implements a video decoder configured to perform operations comprising:

receiving encoded data in a bitstream, wherein the encoded data includes:
one or more syntax elements that control variation of quantization parameters along a spatial dimension within a frame of pixel values, the pixel values of the frame being organized spatially into multiple areas within the frame, the multiple areas being further organized spatially into groups, the one or more syntax elements that control variation of the quantization parameters along the spatial dimension including at least one syntax element that indicates whether variation of the quantization parameters is possible between the multiple areas within the respective groups;

one or more syntax elements that control variation of the quantization parameters along a color channel dimension, the pixel values of the frame also being organized by a luminance channel and two chrominance channels, the one or more syntax elements that control variation of the quantization parameters along the color channel dimension including a syntax element that indicates whether, for a given group of the groups, the encoded data includes syntax elements that indicate how to vary the quantization parameters for the two chrominance channels, respectively, for the given group; and one or more syntax elements that control variation of the quantization parameters along a frequency dimension, including a syntax element that indicates whether the quantization parameters vary or do not vary along the frequency dimension; and decoding the encoded data to reconstruct the frame, wherein the decoding includes:

determining the quantization parameters using the one or more syntax elements that control variation of the quantization parameters along the spatial dimension, the one or more syntax elements that control variation of the quantization parameters along the color channel dimension, and the one or more syntax elements that control variation of the quantization parameters along the frequency dimension;

for blocks of at least some of the multiple areas of the frame, inverse quantizing transform coefficients using the determined quantization parameters; and for the blocks of at least some of the multiple areas of the frame, performing inverse frequency transform operations on the inverse-quantized transform coefficients.

2. The computer system of claim 1, wherein the multiple areas are macroblocks, each of the macroblocks having one or more blocks for the luminance channel, one or more blocks for a first chrominance channel of the two chrominance channels, and one or more blocks for a second chrominance channel of the two chrominance channels.

3. The computer system of claim 2, wherein each of the macroblocks represents a 16×16 unit of the frame for the luminance channel.

4. The computer system of claim 1, wherein the one or more syntax elements that control variation of the quantization parameters along the frequency dimension further include at least one syntax element that indicates how the quantization parameters vary between bands of frequency coefficients.

5. The computer system of claim 1, wherein the encoded data further includes the syntax elements that indicate how to vary the quantization parameters for the two chrominance channels, respectively, for the given group.

6. The computer system of claim 1, wherein the determined quantization parameters include different sets of quantization parameters for at least some different groups among the groups of multiple areas of the frame.

7. The computer system of claim 1, wherein the determined quantization parameters include different sets of quantization parameters for at least some different areas among the multiple areas of the frame.

8. In a computer system, a method comprising:
encoding a frame of pixel values, the pixel values of the frame being organized spatially into multiple areas within the frame, the multiple areas being further organized spatially into groups, the pixel values of the frame also being organized by a luminance channel and two chrominance channels, wherein the encoding includes:

for blocks of at least some of the multiple areas of the frame, performing frequency transform operations, thereby producing transform coefficients;

for the blocks of at least some of the multiple areas of the frame, quantizing the transform coefficients; and setting one or more syntax elements that control variation of quantization parameters along a spatial dimension within the frame, one or more syntax elements that control variation of the quantization parameters along a color channel dimension between the luminance channel and the two chrominance channels, and one or more syntax elements that control variation of the quantization parameters along a frequency dimension; and outputting encoded data as part of a bitstream, wherein the encoded data includes:

the one or more syntax elements that control variation of the quantization parameters along the spatial dimension, including at least one syntax element that indicates whether variation of the quantization parameters is possible between the multiple areas within the respective groups;

the one or more syntax elements that control variation of the quantization parameters along the color channel dimension, including a syntax element that indicates whether, for a given group of the groups, the encoded data includes syntax elements that indicate how to vary the quantization parameters for the two chrominance channels, respectively, for the given group; and the one or more syntax elements that control variation of the quantization parameters along the frequency dimension, including a syntax element that indicates whether the quantization parameters vary or do not vary along the frequency dimension.

9. The method of claim 8, wherein the multiple areas are macroblocks, each of the macroblocks having one or more blocks for the luminance channel, one or more blocks for a first chrominance channel of the two chrominance channels, and one or more blocks for a second chrominance channel of the two chrominance channels.

10. The method of claim 8, wherein the one or more syntax elements that control variation of the quantization parameters along the frequency dimension further include at least one syntax element that indicates how the quantization parameters vary between bands of frequency coefficients.

11. The method of claim 8, wherein the encoded data further includes the syntax elements that indicate how to vary the quantization parameters for the two chrominance channels, respectively, for the given group.

12. The method of claim 8, wherein the determined quantization parameters include different sets of quantization parameters for at least some different groups among the groups of multiple areas of the frame.

13. The method of claim 8, wherein the determined quantization parameters include different sets of quantization parameters for at least some different areas among the multiple areas of the frame.

* * * * *